United States Patent
Kar et al.

(10) Patent No.: US 11,981,807 B2
(45) Date of Patent: May 14, 2024

(54) MOLD RELEASE AGENT FOR METAL CASTING, CONTAINING PINENE EPOXIDE AND/OR DECENE-1 OXIDE

(71) Applicant: ASK Chemicals LLC, Wilmington, DE (US)

(72) Inventors: Sritama Kar, Dublin, OH (US); Christian Priebe, Wuelfrath (DE)

(73) Assignee: ASK Chemicals LLC, Wilmington, DE (US)

( * ) Notice: Subject to any disclaimer, the term of this patent is extended or adjusted under 35 U.S.C. 154(b) by 168 days.

(21) Appl. No.: 17/192,109

(22) Filed: Mar. 4, 2021

(65) Prior Publication Data

US 2021/0301121 A1 Sep. 30, 2021

Related U.S. Application Data

(60) Provisional application No. 63/001,706, filed on Mar. 30, 2020.

(51) Int. Cl.
| | |
|---|---|
| *C08L 63/02* | (2006.01) |
| *B22C 1/02* | (2006.01) |
| *B22C 1/22* | (2006.01) |
| *B22C 7/00* | (2006.01) |
| *C08G 59/20* | (2006.01) |
| *C08G 59/24* | (2006.01) |
| *C08G 59/32* | (2006.01) |
| *C08G 59/36* | (2006.01) |
| *C08G 59/38* | (2006.01) |
| *C08G 59/40* | (2006.01) |
| *C08L 63/04* | (2006.01) |
| *C08L 63/10* | (2006.01) |

(52) U.S. Cl.
CPC .............. *C08L 63/10* (2013.01); *B22C 1/222* (2013.01); *B22C 1/226* (2013.01); *B22C 7/00* (2013.01); *C08G 59/20* (2013.01); *C08G 59/4064* (2013.01); *C08L 2201/08* (2013.01); *C08L 2205/025* (2013.01)

(58) Field of Classification Search
None
See application file for complete search history.

(56) References Cited

U.S. PATENT DOCUMENTS

| | | | | |
|---|---|---|---|---|
| 3,294,743 | A * | 12/1966 | Mack | C08K 5/1575 528/359 |
| 4,985,530 | A * | 1/1991 | Murakami | C08G 59/5033 528/103 |
| 6,604,567 | B1 * | 8/2003 | Woodson | B22C 1/222 523/147 |
| 2003/0188846 | A1 * | 10/2003 | Woodson | B22C 1/226 164/138 |
| 2007/0065608 | A1 * | 3/2007 | Niederst | B65D 17/404 428/34.1 |

* cited by examiner

*Primary Examiner* — Michael J Feely
(74) *Attorney, Agent, or Firm* — Standley Law Group LLP; Jeffrey S. Standley; Kenny W. Pung

(57) ABSTRACT

A release agent is disclosed for use with an organic binder system used in metal casting. The binder system has a Part I component including an epoxy resin and a free radical initiator and a Part II component having an epoxy resin and an acrylate, where the Part I and Part II components are kept separate until the time of use. The release agent will typically have a molecular weight in the range of 150 to 160, with eight to ten carbon atoms. Two examples of the epoxide are pinene oxide and decene-1 oxide, each of which is effective as an internal release agent when present in the binder for a cold box process in the range of about 0.15% to about 1% of the total weight of the Part I and Part II components.

10 Claims, 2 Drawing Sheets

MOLD RELEASE AGENT FOR METAL CASTING, CONTAINING PINENE EPOXIDE AND/OR DECENE-1 OXIDE

CROSS-REFERENCE TO RELATED APPLICATIONS

This application is a non-provisional of U.S. provisional application 63/001,706, filed on 30 Mar. 2020, which is incorporated by reference as if fully recited herein.

TECHNICAL FIELD

The present invention relates to a release agent composition for use in metal casting. More specifically, the mold release agent contains at least one of: pinene epoxide and decene-1 oxide, particularly when the release agent operates as an external release agent.

BACKGROUND ART

A release agent, also known as a mold release agent, is a composition used to facilitate separation of patterns and core boxes from foundry molds and cores. Many industrial operations require the use of release agents to reduce the tendency of a molded product to stick to the mold, or that of a tool, die or machine part to stick to the work piece.

In foundry operations, metal parts are frequently made using "sand casting" methods wherein disposable foundry shapes, such as molds and cores, are fabricated with a mixture of sand and an organic or inorganic binder, sometimes referred to as a "foundry mix". Molds and cores are produced by chemical or heat hardening of the mixture of sand and binder onto a pattern or core box. Sometimes a catalyst is used to cure the foundry mix more rapidly. The mold release agent is used to reduce or eliminate adhesion of a mold to a pattern or core box surface.

In the "cold box" method of metal casting, a volatile curing catalyst (a gaseous reagent, such as sulfur dioxide) is passed through a shaped mixture of the foundry mix, usually in a core box, as opposed to a freestanding pattern mold. In this particular method of manufacture, the foundry mix must have adequate shelf life, meaning that it will not harden in the absence of a catalyst. The cure rate must be very rapid once the foundry mix is exposed to a catalyst.

Release agents, when used, are referred to either as "external" release agents or as "internal" release agents.

An external release agent is typically sprayed or brushed onto a pattern or core box surface periodically during pattern or core preparation. The release agent can be an emulsion or dispersion. If dispersed in a solvent, the solvent serves to wet the surface of a shape-determining mold, onto which the release agent is applied. It is highly desirable to reuse the same pattern or core box many times, to generate a number of molds from the same pattern or core box. Therefore, it is important for the pattern or core to be quickly and cleanly released from the finished molds with a minimum amount of release agent residue or build up on the pattern, and with minimal need to clean the pattern surface.

There are also instances where a release agent is added as a component of the binder system to allow quick and clean release of the pattern or core from the finished mold. In such an instance, the release agent is referred to as an "internal" release agent. An advantage of an internal release agent over an external release agent is the elimination of the step of being applied to the pattern or core box surface. A possible disadvantage could be that a larger amount of the release agent may be required, since a good portion of the release agent is not directly applied to the pattern or core box surface.

An unmet need in the prior art is an effective release agent, especially one that operates as an internal release agent.

SUMMARY

This and other objects are achieved by the release agent described in more detail in the detailed description.

In some embodiments, the release agent is part of a binder system for use in metal casting. Such a binder system comprises a Part I component, a Part II component and an epoxide, acting as the release agent, having a molecular weight in the range of 150 to 160. The Part I component has an epoxy resin and a free radical initiator; the Part II component has an epoxy resin and an acrylate; and the respective components are kept separate until the time of use.

The epoxide preferably is an alkane having from eight to twelve carbon atoms, with a preferred boiling point in the range of about 100 to about 260° C.

One epoxide that satisfies these conditions is pinene oxide.

Another epoxide that satisfies these conditions is decene-1 oxide.

Either of these epoxides operates as an external release agent or as an internal release agent.

In some situations, the epoxide is kept separate from both the Part I component and the Part II component until the time of use, while in other situations, it is included as a part of the Part II component.

When the epoxide is present in the Part II component, it is preferably in the range of from about 0.3 to about 2% by weight of the Part II component. In other situations, the epoxide provided has a weight that is the range of from about 0.15% to about 1% of the total weight of the Part I and Part II components.

Rather than increasing the amount of the Part I or Part II component, especially relative to each other, the epoxide provided effectively replaces an equivalent amount of epoxy resin that would be used in Part I and Part II in the absence of the epoxide.

When the epoxide used is pinene oxide, it is preferably present in the Part II component in an amount in the range of about 0.7% to about 1.0% by weight of the Part II component.

When the epoxide used is decene-1 oxide, it is preferably present in the Part II component in an amount in the range of about 0.3% to about 2.0% by weight of the Part II component.

Other aspects of the inventive concept are embodied by a foundry mix that comprises a major amount of a foundry aggregate with the binder system that has the Part I and Part II components and the epoxide release agent.

Still further aspects of the inventive concept are embodied in a cold box process for preparing a foundry shape, comprising the steps of:
  introducing a foundry mix of claim 15 into a pattern, forming an uncured foundry shape; and
  curing the uncured foundry shape in the pattern with a vaporous catalyst.

In such a cold box process, the preferred active agent of the vaporous catalyst is sulfur dioxide.

BRIEF DESCRIPTION OF THE DRAWINGS

In order to better understand the inventive concept, reference is made to the appended Figures, wherein.

DETAILED DESCRIPTION

Terminology

Figure 1:
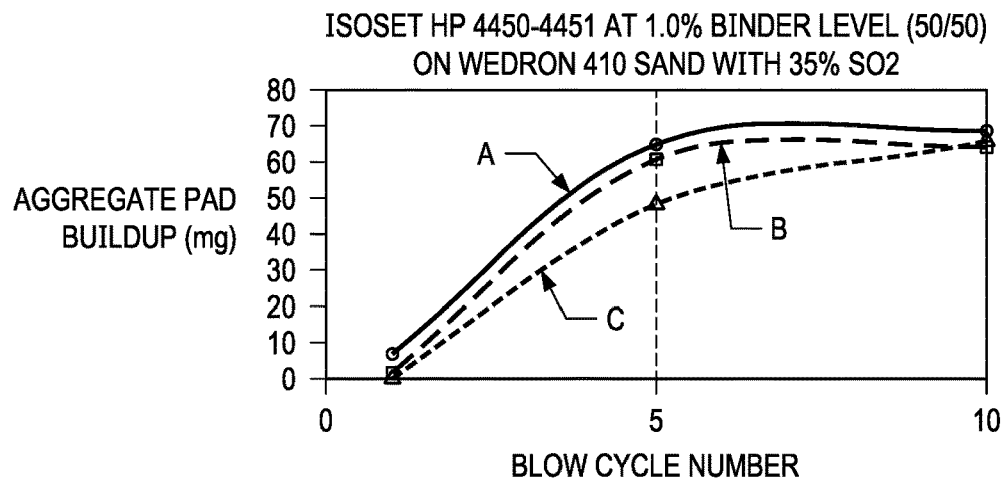
FIG. 1 shows a plot of sand build up weight on a surface plotted against the number of blow cycles, for the ISOSET HP 4450/4451 binder system.

Pinene oxide exists in alpha and beta isomers that have the chemical formula $C_{10}H_{16}O$. It is also referred to as 2,3-epoxypinane, pinene epoxide, 2-pinene oxide, and 2,7,7-trimethyl-3-oxatricyclo [4.1.1.0] octane. It has CAS Registry number 1686-14-2. It is a monoterpene which has important uses in the fragrance industry. It has a boiling point of 102° C. at 1013 mbar and is insoluble in water. It has a molecular weight of 152.

Decene-1 oxide has CAS Registry number 2404-44-6. It has the chemical formula $C_{10}H_{20}O$. Other names include 1-decene oxide, 1,2-epoxydecane and 2-octyl oxirane. It has a boiling point of 234° C. at 1013 mbar and negligible solubility in water. It has a molecular weight of 156.

From the foregoing, it is clear that pinene oxide and decene-1 oxide are epoxides having ten carbon atoms. Each compound is an alkane epoxide, even though one is a linear compound and the other is tricyclic. Each is effectively insoluble in water. Each has a boiling point in the range of from 100° to 260° C. at 1013 mbar. It is believed that epoxides having eight to twelve carbon atoms may possess similar capability to act as a release agent.

ZIP-SLIP is a composition for use as a parting compound or mold release for foundry sand cores or molds, available from ASK CHEMICALS LLC.

Compositions

Three ISOSET cold-box binder systems, commercially available from ASK CHEMICALS LLC, were tested with the proposed release agents. The ISOSET binder systems are two component cold-box binders, specifically, epoxy-acrylic binders that are used in conjunction with sulfur dioxide as the curing gas. In each of the three binder systems, the Part I component has at least one epoxy resin, a free radical initiator and a set of suitable complements. The Part II component in each binder system has at least one epoxy resin, at least one acrylate and a set of suitable complements. In all of the binder systems tested, most of the components can be present in either Part I or Part II and some of the ingredients will be present in each of the Parts. This is done for a variety of reasons, including balancing out ingredients so that equal weights of the two Parts are combined at the time of use and to adjust the viscosities of the two Parts for mixing purposes. There is one notable exception to this general rule, as will be readily known to those of skill in this art: the free radical initiator and all acrylate ingredients must be kept separated from each other until the binder system is to be put into use.

The three ISOSET systems tested are sold commercially as ISOSET HP I 4462/II 4463, ISOSET HP I 4450/II 4451 and ISOSET THERMOSHIELD I 4480/II 4491. The ISOSET THERMOSHIELD binder system does not use equal weights of the two Parts, but uses 60 parts by weight of Part I (4480) with 40 parts by weight of Part II (4491).

ISOSET HP 14450, which is the Part I component, includes bisphenol A-epichlorohydrin polymer, cumene hydroperoxide, dioctyl adipate, cumene, solvent naphtha, and phenyl-2 propanol-2. The bisphenol A-epichlorohydrin polymer is present at a concentration of greater than or equal to 50% by weight and less than 70% by weight of the component, and the cumene hydroperoxide is present at a concentration of greater than or equal to 20% by weight and less than 30% by weight of the component.

ISOSET HP II 4451, which is the Part II component, includes bisphenol A-epichlorohydrin polymer, trimethylolpropane triacrylate, dioctyl adipate, solvent naphtha, and 3-(trimethoxysilyl)propyl glycidyl ether. The bisphenol A-epichlorohydrin polymer is present at a concentration of greater than or equal to 30% by weight and less than 50% by weight of the component, and the trimethylolpropane triacrylate is present at a concentration of greater than or equal to 30% by weight and less than 50% by weight of the component.

ISOSET HP I 4462, which is the Part I component, includes cumene hydroperoxide, cumene, phenyl-2 propanol-2.

ISOSET HP II 4463, which is the Part II component, includes trimethylolpropane triacrylate, hexanediol diacrylate, 3-(trimethoxysilyl)propyl glycidyl ether, kerosene, and epichlorohydrin-phenolformaldehyde resin.

ISOSET THERMOSHIELD 14480, which is the Part I component, includes phenol-formaldehyde polymer glycidyl ether, cumene hydroperoxide, cumene, and phenyl-2 propanol-2. The phenol-formaldehyde polymer glycidyl ether is present at a concentration of greater than or equal to 50% by weight and less than 70% by weight of the component, and the cumene hydroperoxide is present at a concentration of greater than or equal to 30% by weight and less than 50% by weight of the component.

ISOSET THERMOSHIELD 114491, which is the Part II component, includes trimethylolpropane triacrylate, bisphenol A-epichlorohydrin polymer, hexanediol diacrylate, and kerosene. The bisphenol A-epichlorohydrin polymer is present at a concentration of greater than or equal to 20% by weight and less than 30% by weight of the component, the trimethylolpropane triacrylate is present at a concentration of greater than or equal to 50% by weight and less than 70% by weight of the component, and the hexanediol diacrylate is present at a concentration of greater than or equal to 5% by weight and less than 10% by weight of the component.

To prepare the sand mix for testing, the proper weights of Parts I and II were added to a WEDRON 410 sand, the total weights of Parts I and II amounting to 1%, based on the sand weight.

Once the binder system was mixed with the sand and molded, the resulting foundry mixture was cured with 35% sulfur dioxide blended in nitrogen, according to conventional industry practice.

Further details and variations on this overall process are provided in the Examples provided below, as needed.

Sand Build-Up with External Release Agent

A round of initial subjective testing was conducted to test the efficacy of pinene epoxide and decene-1 oxide, individually, as an external release agent, that is, a release agent applied directly to a surface of a mold or core prior to a blow cycle of the mold. In each case, the surface was tested for a total of ten blow cycles, with the release agent applied before each blow cycle, as would be done industrially. As a baseline, each binder system was also tested with no release agent being used. After each blow cycle, the surface was wiped down with a pad. The aggregate amount of buildup (in mg) on the pad was plotted against the number of blow cycles. While this test is not a rigorous quantitative result, it is believed to illustrate possible efficacy of the release agent, especially when compared to a baseline example that uses either no release agent or a commercially-accepted release agent. The analysis is somewhat confounded, as there are three results possible. A very efficacious external release agent leaves very little foundry mix on the mold to be removed by the pad. If the release agent operates in an intermediate fashion, foundry mix remains on the mold after the blow cycle, but the foundry mix is not so firmly adhered, resulting in it being removed by the wiping operation. In the last situation, the release agent operates poorly and the foundry mix remaining on the mold after wiping provides a desirable attachment site for the foundry mix in a subsequent blow cycle, so the aggregate buildup on the pad per cycle has an increasing slope, as the pad pick-up continues until a flattening of the curve is observed.

FIG. 1 graphically depicts sand build up on the wiping pad plotted against blow cycles for the ISOSET HP 4450/4451 binder system (50/50) at 1% (based on sand binder system) on WEDRON 410 sand, cured with 35% $SO_2$, using no release agent, pinene oxide and decene-1 oxide. These data show that when no release agent (line A) is used, the aggregate buildup increases in an approximately linear manner for about 5 blow cycles, but after about five cycles, the buildup per cycle has a flat slope, suggesting buildup on the mold, as would be expected. When pinene oxide (line B) is used, it follows a very similar curve as the "no release agent", but the lower total buildup at any number of blow cycles suggests that less foundry mix may be available to be wiped off. When decene-1 oxide (line C) is used as an external release agent, the buildup per cycle is less, but the performance over cycles is much more linear, so that by ten cycles the decene-1 is almost indistinguishable from the "no release agent" case.

Figure 2:
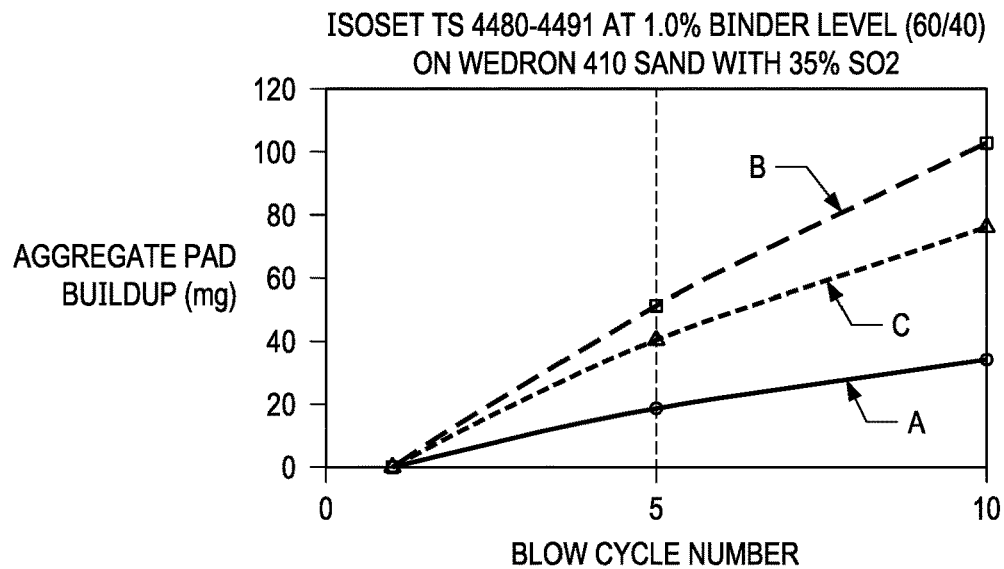
FIG. 2 shows a plot of sand build up weight on a surface plotted against the number of blow cycles, for the ISOSET THERMOSHIELD 4480/4481 binder system.

FIG. 2 graphically depicts sand build up plotted against blow cycles for the ISOSET THERMOSHIELD 4480/4491 binder system (60/40) at 1% (based on sand binder system) on WEDRON 410 sand, cured with 35% $SO_2$, using no release agent (line A), pinene oxide (line B) and decene-1 oxide (line C). These data show that the "no release agent", the pinene oxide and the decene-1 oxide accumulate foundry mix on the wiping pad in a generally linear manner over the ten blow cycles, but the pinene oxide and decene-1 apparently allow more foundry mix to remain on the mold, even though it is removed. This is considered a negative result for the potential external release agents.

Figure 3:
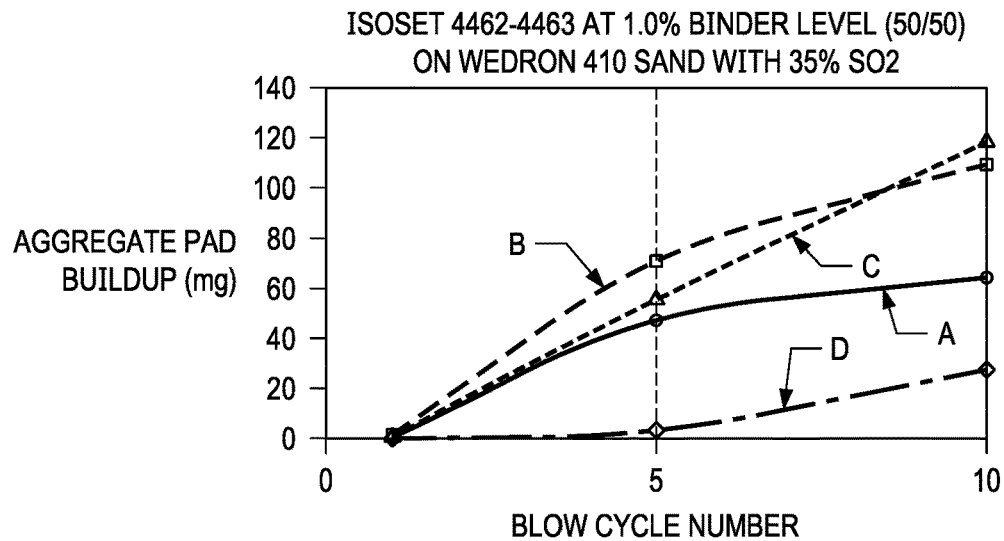
FIG. 3 shows a plot of sand build up weight on a surface plotted against the number of blow cycles, for the ISOSET HP 4462/4463 binder system.

FIG. 3 graphically depicts sand build up plotted against blow cycles for the ISOSET HP 4462/4463 binder system (50/50) at 1% (based on sand binder system) on WEDRON 410 sand, cured with 35% $SO_2$, using no release agent (line A), pinene oxide (line B), decene-1 oxide (line C) and the ZIP-SLIP external release agent (line D) that is commercially-available from ASK Chemicals LLC. In this case, a release agent of some effect would be expected to fit within the space defined between the accepted external release agent and "no release agent." However, as in the case of the proposed external release agents with ISOSET THERMOSHIELD 4480/4491, the result is negative for pinene oxide with this ISOSET binder system.

Overall, both decene-1 oxide and pinene oxide show positive effect as an external release agent when used with the ISOSET HP 4462/4463 and ISOSET THERMOSHIELD 4480/4491 binder systems, but not with the ISOSET HP 4450/4451 binder system. In a use as an external agent, the target compound would be expected to interact more strongly with the surface than with the binder system.

Use as Internal Release Agent

When a release agent is added to the binder system components to be present with them at the time of mixing, the release agent is referred to as an internal release agent.

The protocol for testing pinene oxide and decene-1 oxide individually as an internal release agent was established. A 2×2 penetration core cylindrical molding tool was thoroughly cleaned with acetone and dried prior to each mix. A sand mix, amounting to 150.0 g of sand, was prepared using the selected binder system, added to the 2×2 molding tool and hand-rammed twice with a weighted hand rammer. The cores were gassed with 35% $SO_2$ at 30 psig for 0.5 seconds and purged for 10 seconds. At 30 seconds after the gassing, the core release force was tested, using a tensile tester set to transverse testing conditions. Ten replicates were done with each mix tested.

A sticky pad accumulation test was also conducted for the ten replicate core cycles.

With each of the three binder systems being investigated, there were five mixes tested to determine efficacy of the two potential release agents. The first test mix, designated as "N," no internal release agent was added to the commercially-available binder system being tested. The second and third test mixes involved the addition of pinene oxide at a level of 0.95% by weight to the Part of the binder system to which it was added. As the second mix involved addition to Part I and the third mix involved the addition to Part II, these mixes are referred to in the data and figures as "PI" and "PII." Finally, the fourth and fifth test mixes involved the addition of decene-1 oxide at a level of 1.5% by weight to the Part of the binder system to which it was added. As the fourth mix involved addition to Part I and the fifth mix involved the addition to Part II, these mixes are referred to in the data and figures as "DI" and "DII."

As noted above, the commercially-available ISOSET binder systems contain a significant epoxide constituent in each of Part I and Part II. In each of the mixes PI, PII, DI and DII, the internal release agent being tested replaced, on a weight-for-weight basis, a part of the epoxide constituent.

ISOSET HP 4450/4451 Mixes

The five test mixes described above were prepared using the commercially-available Parts I (4450) and II (4451) of the ISOSET HP 4450/4451 binder system and ten replicates for each mix were tested as to release force and sticky pad accumulation.

The core release force test showed that the baseline N exhibited the highest release force, at 121.44 psi, with a standard deviation of 28.00.

In both mixes where the release agent was added to Part I, that is, mixes PI and DI, the release force was lower. Specifically, when pinene oxide was present in Part I at 0.95% by weight (based on total Part I), the release force was 101.31 psi with a standard deviation of 26.71. When decene-1 oxide was present in Part I at 1.5%, the release force was 103.07 psi with a standard deviation of 28.14.

A similar effect was seen when the release agent was added to Part II, that is, mixes PII and DII, and the effect of the release agents in Part II may be more profound than in Part I. Again, being specific, when pinene oxide was present in Part II at 0.95% (based on total Part II), the release force was 81.81 psi with a standard deviation of 19.54. When decene-1 oxide was present in Part II at 1.5%, the release force was 93.58 psi with a standard deviation of 24.33.

The sticky pad accumulation test with ISOSET HP 4450/4451 was conducted for pinene oxide and decene-1 oxide, but the data are not presented, as they appear to have a noise level that makes useful distinctions unlikely.

Since pinene oxide and decene-1 oxide each provided positive effect as an internal release agent in Part II in the ISOSET HP 4450/4451 binder system, each was further investigated as a Part II additive, to determine if some optimization of the level of the release agent would be observed.

Pinene oxide was tested for release force at 0.55% and 0.75%. When combined with the data already at hand for the N baseline and the PII data collected at 0.95%, four data points were available for comparison. An appropriate comparison involves a test to see which, if any, of the pinene oxide levels showed a statistically significant difference in release force when compared to the N baseline data. The selected confidence interval of 95% is a commonly-accepted measure and there were 9 degrees of freedom in the test. The difference was only statistically significant at the 0.95% level of pinene oxide in the Part II constituent.

In a similar manner, decene-1 oxide was tested for release force against the control N test at 0.55% and 0.75%, along with the DII data point at 1.5%, previously described. At the 95% confidence level, the decene-1 oxide was effective at both 0.95% and 1.5%.

With both pinene oxide and decene-1 oxide, the sticky pad accumulation test was conducted, but, especially at the lower additive levels, the noise of the data made the data uncertain.

From these data, it was concluded that pinene oxide only becomes effective when used at the 0.95% by weight level in Part II of the ISOSET HP 4450/4451 binder system. When compared against the N and DII release force data, it was determined that decene-1 oxide is not effective as an internal release agent at 0.55 or 0.75% by weight, but is effective when used at either the 0.95 or 1.5% by weight level in Part II of the ISOSET HP 4450/4451 binder system. Neither proposed release agent appeared to be effective when added to Part I of the binder system.

ISOSET THERMOSHIELD 4480/4491 Mixes

The five test mixes described above were prepared using the commercially-available Parts I (4480) and II (4491) of the ISOSET THERMOSHIELD binder system and ten replicates for each mix were tested as to release force and sticky pad accumulation. As a reminder, the ISOSET THERMOSHIELD 4480/4491 is used with Parts I and II mixed in a 60/40 weight ratio and not in a 50/50 ratio.

The baseline N tests exhibited the highest release force, at 182.92 psi, with a standard deviation of 36.05.

In both mixes where the release agent was added to Part I, that is, mixes PI and DI, the release force was lower. Specifically, when pinene oxide was present in Part I at 0.95% (based on total Part I), the release force was 127.12 psi with a standard deviation of 25.84. When decene-1 oxide was present in Part I at 1.5%, the release force was 99.95 with a standard deviation of 30.70.

A similar effect was seen when the release agent was added to Part II, that is, mixes PII and DII, and the effect of the release agents in Part II may be more profound than in Part I. Again, being specific, when pinene oxide was present in Part II at 0.95% (based on total Part II), the release force was 111.95 psi with a standard deviation of 31.14. When decene-1 oxide was present in Part II at 1.5%, the release force was 124.43 psi with a standard deviation of 37.32.

In the sticky pad accumulation test, the data are somewhat inconsistent, at least for decene-1 oxide, as the data show better performance in Part II, although the release force test shows better performance in Part I.

Since pinene oxide and decene-1 oxide each provided positive effect as an internal release agent in Part II in the ISOSET HP 4450/4451 binder system, each was investigated further in Part II to determine if an optimal level of the release agent additive could be determined. An attempt was made to determine optimal range for each of pinene oxide and decene-1 oxide as an internal release agent that in packaged as a Part II component for the ISOSET THERMOSHIELD 4480/4491 binder system. The data are shown by way of bar chart in FIG. 4, where N shows the control, that is, no release agent added to the system.

Pinene oxide was tested for release force at 0.35% (P35), 0.55% (P55) and 0.75% (P75). When combined with the data already at hand for the N baseline and the PII data collected at 0.95% (P95), five data points were available for comparison. As in the ISOSET HP 4450/4451 case, the data were compared for statistical significance at the 95% confidence level with 10 degrees of freedom. The difference was statistically significant at both the 0.95% level of pinene oxide in the Part II constituent.

Figure 4:
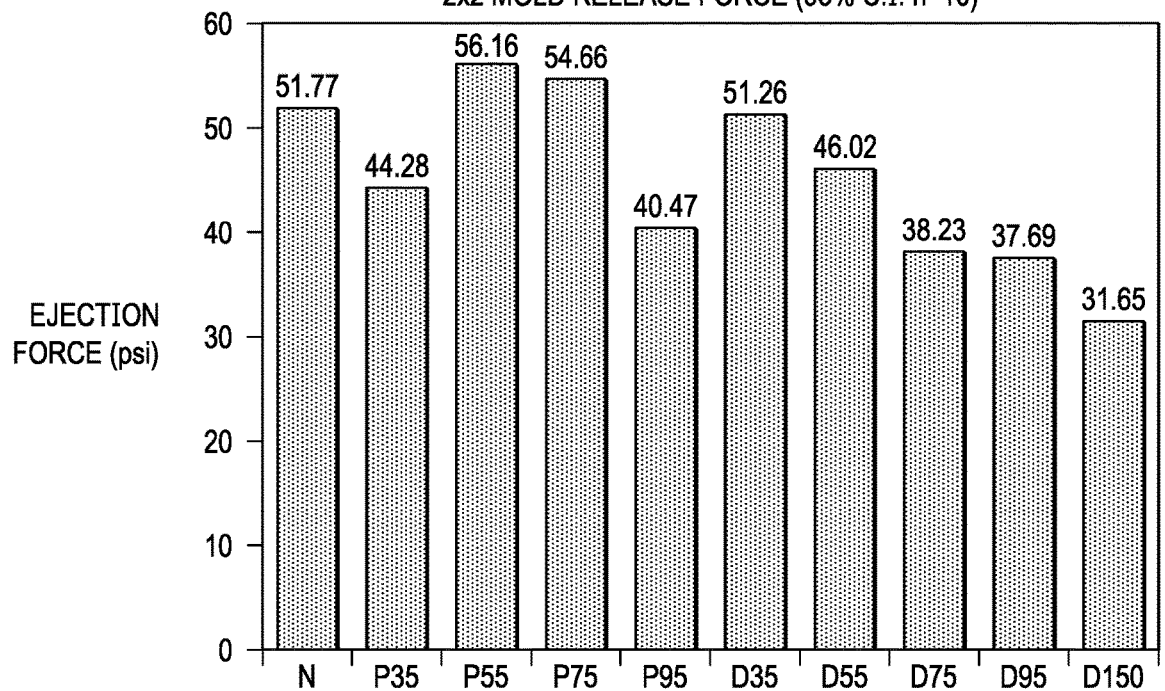
FIG. 4 is a bar chart showing the release force for the ISOSET THERMOSHIELD 4480/4491 binder system, both without a release agent and with a variety of release agents.

In a similar manner, and as also shown in FIG. 4, decene-1 oxide was tested for release force against the control N test at 0.35% (D35), 0.55% (D55), 0.75% and 0.95% (D95), along with the DII datapoint at 1.5% (D150), previously described. At the 95% confidence level, the decene-1 oxide was effective at the 0.75% level and higher.

From these data, it was concluded that pinene oxide only becomes effective when used at the 0.95% by weight level in Part II of the ISOSET THERMOSHIELD 4480/4491 binder system. When compared against the N and DII release force data, it was determined that decene-1 oxide is effective as an internal release agent in the 0.75% to 1.50% by weight range in Part II of the ISOSET THERMOSHIELD 4480/4491 binder system. Qualitatively, the decene-1 oxide appears to work better in the ISOSET THERMOSHIELD 4480/4491 binder system than it does in the ISOSET HP 4450/4451 system.

ISOSET HP 4462/4463 Mixes

The five test mixes described above were prepared using the commercially-available Parts I (4462) and II (4463) of the ISOSET HP 4462/4463 binder system and ten replicates for each mix were tested as to release force and sticky pad accumulation.

The baseline N tests exhibited the highest release force, at 201.24 psi, with a standard deviation of 37.18.

In both mixes where the release agent was added to Part I, that is, mixes PI and DI, the release force was lower. Specifically, when pinene oxide was present in Part I at 0.95% (based on total Part I), the release force was 155.02 psi with a standard deviation of 33.14. When decene-1 oxide was present in Part I at 1.5%, the release force was 120.64 with a standard deviation of 20.60.

A similar effect was seen when the release agent was added to Part II, that is, mixes PII and DII, and the effect of the release agents in Part II may be more profound than in Part I.

In the sticky pad accumulation test, the data for both additives would indicate better performance in Part I, but these data are considered to be noisy, so further testing to optimize the levels of additive were focused on Part II.

An attempt was made to determine optimal range for each of pinene oxide and decene-1 oxide when used as an internal release agent that in packaged as a Part II component for the ISOSET HP 4462/4463 binder system. The data are shown by way of bar chart in FIG. 5, where N shows the control, that is, no release agent added to the system.

Pinene oxide was tested for release force at 0.35% (P35), 0.55% (P55) and 0.75% (P75). When combined with the data already at hand for the N baseline and the PII data collected at 0.95% (P95), five data points were available for comparison. As in the ISOSET HP 4450/4451 case, the data were compared for statistical significance at the 95% confidence level with 10 degrees of freedom. The difference was statistically significant at both the 0.75% and 0.95% level of pinene oxide in the Part II constituent.

Figure 5:
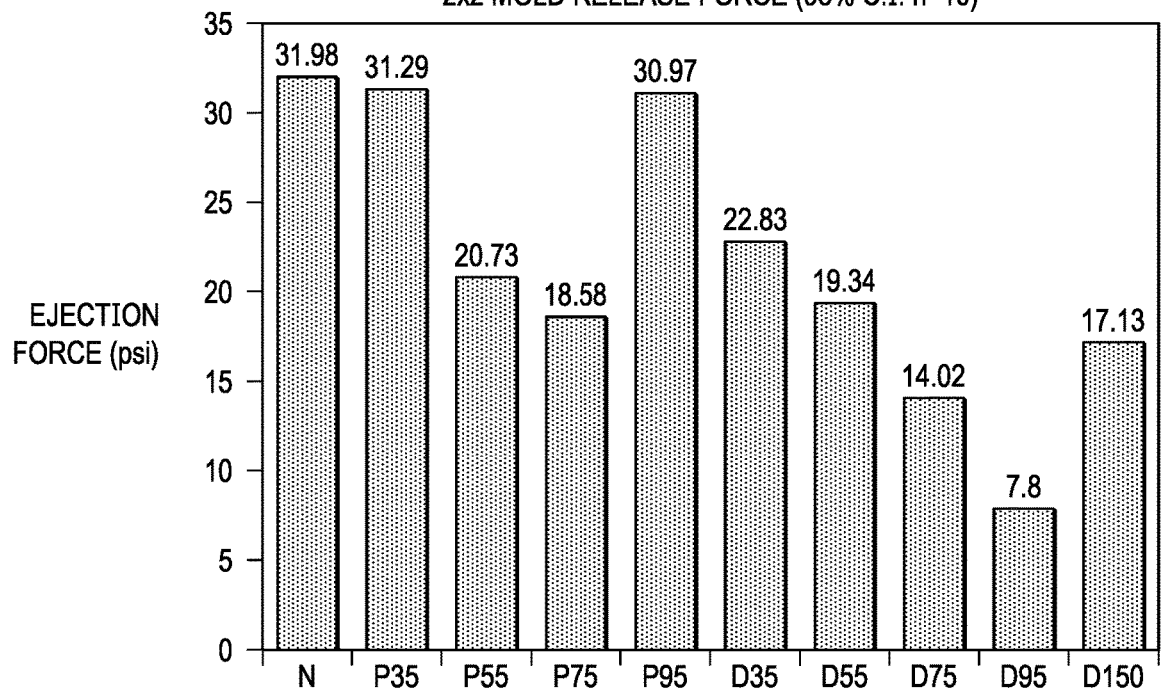
FIG. 5 is a bar chart showing the release force for the ISOSET HP 4462/4463 binder system, both without a release agent and with a variety of release agents.

In a similar manner, and as also shown in FIG. 5, decene-1 oxide was tested for release force against the control N test at 0.35% (D35), 0.55% (D55), 0.75% and 0.95% (D95), along with the DII datapoint at 1.5% (D150), previously described. At the 95% confidence level, the decene-1 oxide was effective at all levels.

With both pinene oxide and decene-1 oxide, the sticky pad accumulation test was conducted, but, especially at the lower additive levels, the noise of the data made the data uncertain.

From these data, it was concluded that pinene oxide only becomes effective when used at either the 0.75% or 0.95% by weight level in Part II of the ISOSET HP 4462/4463 binder system. When compared against the N and DII release force data, it was determined that decene-1 oxide is effective as an internal release agent at all tested levels in Part II of the ISOSET HP 4462/4463 binder system.

No particular mechanisms are suggested for the reasons why pinene oxide or decene-1 oxide operate more effectively as release agents when added to the binder system, and especially when added to Part II of the binder system, but the result is considered unexpected when compared to the lack of effect of these compounds as external release agents. Also, no mechanism is suggested as to why pinene oxide and decene-1 oxide show similar effects other than both are epoxides of similar molecular weights and boiling points, although pinene oxide, as a monoterpene, has a quite different structure than the highly linear decene-1 oxide.

What is claimed is:

1. A foundry mix, comprising:
   a foundry aggregate; and
   a binder system comprising:
     a Part I component comprising: a bisphenol A-epichlorohydrin polymer as an epoxy resin, present at a concentration of greater than or equal to 50% by weight and less than 70% by weight of the component; and cumene hydroperoxide as a free radical initiator, present at a concentration of greater than or equal to 20% by weight and less than 30% by weight of the component;
     a Part II component comprising: a bisphenol A-epichlorohydrin polymer as an epoxy resin, present at a concentration of greater than or equal to 30% by weight and less than 50% by weight of the component; trimethylol propane triacrylate (TMPTA), present at a concentration of greater than or equal to 30% by weight and less than 50% by weight of the component; and
     an epoxide comprising at least one of pinene oxide and decene-1 oxide;
   wherein the Part I and Part II components, respectively, are included in the binder system at weight ratio of 50/50;
   wherein the epoxide is present as part of the Part II component in an amount ranging from about 0.3% to about 2.0% by weight of the Part II component; and
   wherein at least the Part I component and the Part II component are mixed together and combined with the foundry aggregate.

2. The foundry mix of claim 1, wherein the epoxide provided effectively replaces an equivalent amount of epoxy resin that would be used in Part I and Part II of the binder system in the absence of the epoxide.

3. The foundry mix of claim 1, wherein the epoxide is present in the Part II component in an amount in the range of about 0.95% to about 1.5% by weight of the Part II component.

4. A cold box process for preparing a foundry shape, comprising the steps of:
   introducing a foundry mix of claim 1 into a pattern,
   forming an uncured foundry shape; and
   curing the uncured foundry shape in the pattern with a vaporous catalyst.

5. The cold box process of claim 4, wherein the active agent of the vaporous catalyst is sulfur dioxide.

6. A foundry mix, comprising:
   a foundry aggregate; and
   a binder system comprising:
     a Part I component comprising: a phenol-formaldehyde polymer glycidyl ether as an epoxy resin, present at a concentration of greater than or equal to 50% by weight and less than 70% by weight of the component; and cumene hydroperoxide as a free radical initiator, present at a concentration of greater than or equal to 30% by weight and less than 50% by weight of the component;
     a Part II component comprising: a bisphenol A-epichlorohydrin polymer as an epoxy resin, present at a concentration of greater than or equal to 20% by weight and less than 30% by weight of the component; trimethylol propane triacrylate (TMPTA), present at a concentration of greater than or equal to 50% by weight and less than 70% by weight of the component; and hexanediol diacrylate, present at a concentration of greater than or equal to 5% by weight and less than 10% by weight of the component; and
     an epoxide comprising at least one of pinene oxide and decene-1 oxide;
   wherein the Part I and Part II components, respectively, are included in the binder system at weight ratio of 60/40;
   wherein the epoxide is present as part of the Part II component in an amount ranging from about 0.3% to about 2.0% by weight of the Part II component; and
   wherein at least the Part I component and the Part II component are mixed together and combined with the foundry aggregate.

7. The foundry mix of claim 6, wherein the epoxide provided effectively replaces an equivalent amount of epoxy resin that would be used in Part I and Part II of the binder system in the absence of the epoxide.

8. The foundry mix of claim 6, wherein the epoxide is present in the Part II component in an amount in the range of about 0.95% to about 1.5% by weight of the Part II component.

9. A cold box process for preparing a foundry shape, comprising the steps of:
   introducing a foundry mix of claim 6 into a pattern, forming an uncured foundry shape; and
   curing the uncured foundry shape in the pattern with a vaporous catalyst.

10. The cold box process of claim 9, wherein the active agent of the vaporous catalyst is sulfur dioxide.

* * * * *

UNITED STATES PATENT AND TRADEMARK OFFICE
CERTIFICATE OF CORRECTION

PATENT NO. : 11,981,807 B2
APPLICATION NO. : 17/192109
DATED : May 14, 2024
INVENTOR(S) : Sritama Kar et al.

It is certified that error appears in the above-identified patent and that said Letters Patent is hereby corrected as shown below:

In the Specification

Column 4, Line 10, please delete "14450" and insert -- I 4450 --.
Column 4, Line 36, please delete "14480" and insert -- I 4480 --.
Column 4, Line 45, please delete "1 14491" and insert -- II 4491 --.

Signed and Sealed this
Twenty-fifth Day of June, 2024

*Katherine Kelly Vidal*

Katherine Kelly Vidal
*Director of the United States Patent and Trademark Office*